US009194360B2

(12) United States Patent
Payre et al.

(10) Patent No.: US 9,194,360 B2
(45) Date of Patent: *Nov. 24, 2015

(54) METHOD AND INSTALLATION FOR PRODUCING SUPPLEMENTARY ELECTRICAL ENERGY

(71) Applicant: NATURE AND PEOPLE FIRST, Paris (FR)

(72) Inventors: Denis Payre, Paris (FR); Pierre Pisterman, Paris (FR); Patrice Pisterman, Nancy (FR)

(73) Assignee: NATURE AND PEOPLE FIRST, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/215,548

(22) Filed: Mar. 17, 2014

(65) Prior Publication Data

US 2014/0246860 A1  Sep. 4, 2014

Related U.S. Application Data

(63) Continuation of application No. 13/519,280, filed as application No. PCT/FR2011/052223 on Sep. 26, 2011, now Pat. No. 8,766,469.

(30) Foreign Application Priority Data

Sep. 27, 2010 (FR) ..................................... 10 57756

(51) Int. Cl.
 *F01D 15/10* (2006.01)
 *F02C 6/00* (2006.01)
 (Continued)

(52) U.S. Cl.
 CPC ............... *F03B 13/06* (2013.01); *F03D 9/025* (2013.01); *F05B 2240/40* (2013.01);
 (Continued)

(58) Field of Classification Search
 USPC .......................................... 290/4 R, 43, 52
 See application file for complete search history.

(56) References Cited

U.S. PATENT DOCUMENTS 2,962,599 A  11/1960  Pirkey
4,241,283 A  12/1980  Storer
(Continued)

FOREIGN PATENT DOCUMENTS

CN  101016877  8/2007
CN  201014843 Y  1/2008
(Continued)

OTHER PUBLICATIONS

Chinese Office Action, Feb. 28, 2015; Chinese Patent Application No. 201180046455.1 with English translation (28 pages).
(Continued)

*Primary Examiner* — Pedro J Cuevas
(74) *Attorney, Agent, or Firm* — Hamre, Schumann, Mueller & Larson, P.C.

(57) ABSTRACT

An installation for producing supplementary electrical energy for an electricity network includes at least first and second water reservoirs, the first water reservoir (311, 312) being situated at a first level and the second water reservoir (120) being situated at a second level lower than the first level, a communicating pipe (340) between the first water reservoir (311, 312) and the second water reservoir (120) being provided with a remote-controlled valve (350), and a hydroelectric generating system (330) being provided with a pumping installation. The first and/or second water reservoir (311, 312; 120) is integrated in the foundations in the lower portion of an artificial building (301, 303; 200A) that needs to be built for a primary function independently of a secondary function of producing electricity. The first water reservoir (315) or the second water reservoir (120) may constitute a common body of water in the vicinity of ground level. The water reservoirs (311, 312; 210; 220) integrated in foundations of buildings may in particular cooperate with installations for air-conditioning or heating the buildings at the base of which they are constructed, or associated buildings.

20 Claims, 9 Drawing Sheets

(51) Int. Cl.
*H02K 7/18* (2006.01)
*H02P 9/04* (2006.01)
*F03B 13/06* (2006.01)
*F03D 9/02* (2006.01)
*F03B 13/00* (2006.01)
*F01C 13/00* (2006.01)
*F24F 5/00* (2006.01)

(52) U.S. Cl.
CPC *F05B 2240/9112* (2013.01); *F24F 2005/0057* (2013.01); *Y02B 10/30* (2013.01); *Y02B 10/40* (2013.01); *Y02B 10/50* (2013.01); *Y02E 10/22* (2013.01); *Y02E 10/728* (2013.01); *Y02E 60/17* (2013.01)

(56) References Cited

U.S. PATENT DOCUMENTS

| | | | |
|---|---|---|---|
| 4,443,707 A | 4/1984 | Scieri et al. | |
| 4,698,516 A | 10/1987 | Thompson | |
| 5,389,821 A | 2/1995 | Moulliet | |
| 5,905,312 A | 5/1999 | Liou | |
| 6,051,892 A | 4/2000 | Toal | |
| 6,216,463 B1 | 4/2001 | Stewart | |
| 6,359,347 B1 | 3/2002 | Wolf | |
| 6,732,712 B2 | 5/2004 | Klotz et al. | |
| 6,861,766 B2 | 3/2005 | Rembert | |
| 6,981,376 B2 | 1/2006 | Dutta | |
| 7,841,306 B2 | 11/2010 | Myers et al. | |
| 8,008,796 B2 | 8/2011 | Muchow | 290/54 |
| 8,030,790 B2 | 10/2011 | Kamenov | 290/43 |
| 8,058,741 B1 | 11/2011 | Echemendia | 290/53 |
| 8,127,542 B1 | 3/2012 | Dolcimascolo | 60/398 |
| 8,307,640 B1 | 11/2012 | Callen | 60/398 |
| 8,492,918 B1 | 7/2013 | Kamenov | 290/43 |
| 2003/0102676 A1 | 6/2003 | Rembert | |
| 2005/0034452 A1 | 2/2005 | Davis | |
| 2005/0045155 A1 | 3/2005 | Harvey | |
| 2007/0101989 A1 | 5/2007 | Strathman | |
| 2008/0044529 A1 | 2/2008 | Yamashita | 426/258 |
| 2008/0252078 A1 | 10/2008 | Myers et al. | |
| 2008/0253837 A1 | 10/2008 | Miller | |
| 2009/0058092 A1 | 3/2009 | Chen | |
| 2009/0121481 A1 | 5/2009 | Riley | |
| 2010/0259044 A1 | 10/2010 | Muchow | |
| 2010/0320764 A1 | 12/2010 | Myers et al. | |
| 2011/0025065 A1 | 2/2011 | Mulugeta | |
| 2013/0257055 A1* | 10/2013 | Simpson | 290/52 |

FOREIGN PATENT DOCUMENTS

| | | |
|---|---|---|
| CN | 101656423 | 2/2010 |
| CN | 101761444 | 6/2010 |
| DE | 2928476 | 1/1981 |
| EP | 0599691 | 6/1991 |
| EP | 0599691 | 6/1994 |
| EP | 1270917 | 1/2003 |
| EP | 1533514 | 5/2005 |
| EP | 1568880 | 8/2005 |
| EP | 2148076 | 1/2010 |
| FR | 2789126 | 8/2000 |
| FR | 2928476 | 9/2009 |
| GB | 190704727 | 0/1907 |
| JP | 01-240485 | 9/1989 |
| JP | 06-137254 | 5/1994 |
| JP | 11-222836 | 8/1999 |
| JP | 2006-299541 | 11/2006 |
| JP | 2010-189857 | 9/2010 |
| WO | WO 2011/036410 | 3/2011 |

OTHER PUBLICATIONS

Japanese Office Action, Apr. 28, 2015; Japanese Patent Application No. 2013-529699 with English translation (14 pages).

* cited by examiner

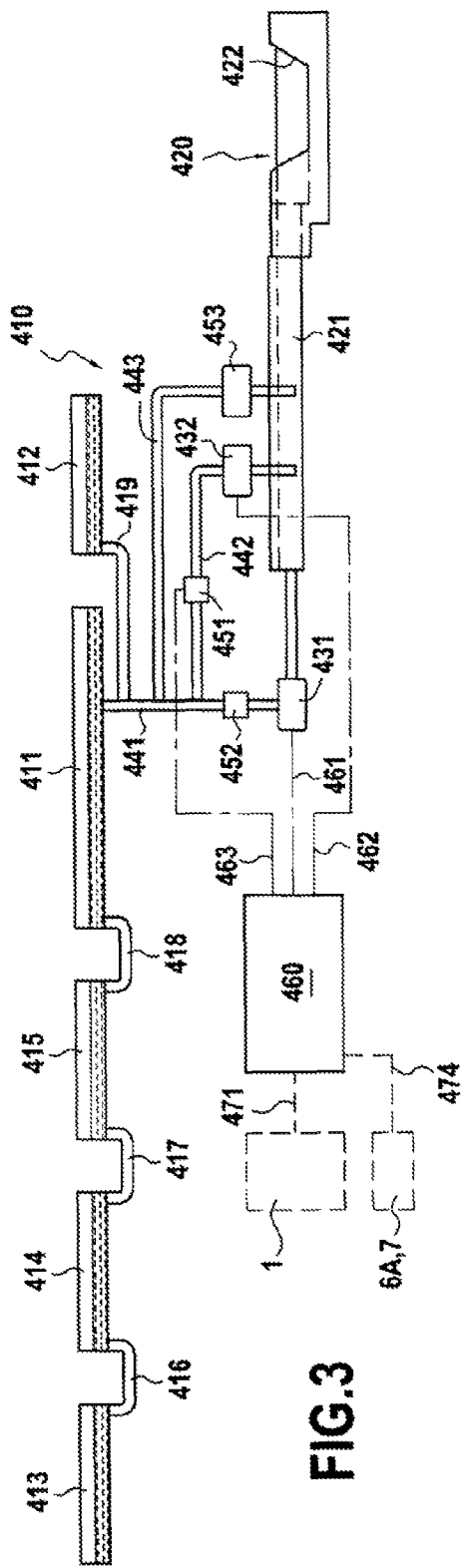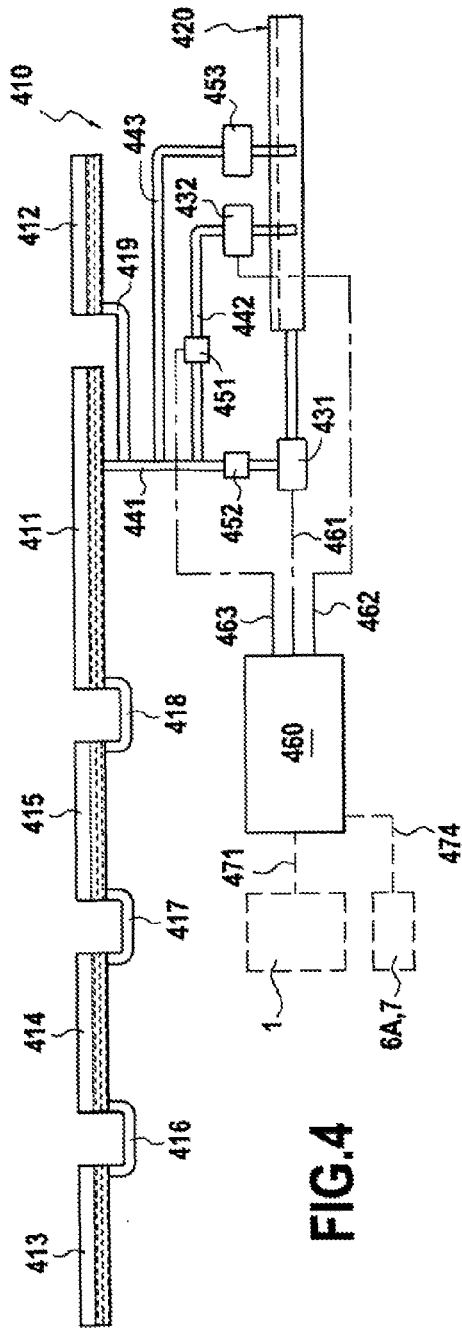

METHOD AND INSTALLATION FOR PRODUCING SUPPLEMENTARY ELECTRICAL ENERGY

FIELD OF THE INVENTION

The invention relates to a method and an installation for producing supplementary electrical energy for an electricity network.

PRIOR ART

A hydro-electric energy generation system is already known, for example from Document U.S. Pat. No. 4,443,707, which transforms the potential energy of a reservoir of water into kinetic energy for driving a turbine coupled to an electricity generator. In that system, water stored in a reservoir situated at a high level is released into a penstock leading to the turbine for producing electricity if a supplementary of electricity is required in the network to respond to a peak in electricity consumption.

Indeed it is known that the consumption of electrical energy is irregular and that peaks in demand occur, for example at the end of the day, or in cold weather when the demand for electrical heating increases, or conversely in a heatwave when many air-conditioning units are in use. The hydro-electric energy produced during peak periods may be sent to the electrical energy network to respond to the increase in demand, given that the amount of electrical energy produced by other means, for example in a nuclear power station, is difficult to modify. Similarly, electrical energy produced by environmentally friendly and renewable energy sources (sun, wind) is produced in a highly random manner as a function of weather conditions.

According to Document U.S. Pat. No. 4,443,707, outside peak periods electrical energy from the main energy distribution network is used to power a lifting pump that returns water recovered from a water reservoir situated at a low level to the water reservoir situated at a high level so as to reconstitute potential energy for the next peak period. The high and lower water reservoirs are then generally natural pools such as lakes or mines.

An installation for generating supplementary electrical energy is also known, for example from Document U.S. Pat. No. 6,861,766, which installation uses a pumped-storage hydro-electric generating system that includes upper and lower artificial water reservoirs associated with a penstock and a reversible hydro-electric machine to supply an electricity network with supplementary electrical energy using the potential energy of the water stored in the upper water reservoir, while the energy necessary to drive the hydro-electric machine when operating as a pump is obtained from wind turbines and is therefore not taken from the energy distribution network, thereby reducing the consumption of electricity produced from fossil fuels or by nuclear means. The cost of such an installation dedicated to the production of supplementary electrical energy is high, given in particular the necessity to produce a structure that is sufficiently strong to support the upper water reservoir.

Document US 2009/0058092 A1 also describes the use of upper water reservoirs placed in the higher stories of high buildings to produce supplementary electrical energy by means of a pumped-storage hydro-electric generating system. However, given building constraints and seismic risks, the size of the upper water reservoirs is limited and the energy produced from the potential energy of the water placed in those water reservoirs is in practice insufficient to be able to send significant electrical energy into a network in peak consumption periods. In particular an installation of that kind cannot produce power greater than approximately 100 kilowatts (kW).

Document FR 2 789 126 also discloses a device for recovering hydraulic energy for buildings of the private house or apartment building type including a first or upper water reservoir installed high up in the roof space or on the roof of the building and a second or lower water reservoir installed in the lower part of the building, in the cellar, or underground near the building.

That device may be associated with devices for recovering solar, wind, or geothermal energy that may in particular be used to drive a pump for transferring water between the lower water reservoir and the upper water reservoir, while a turbine associated with a generator is actuated selectively by the flow of liquid flowing in a down pipe between the upper water reservoir and the lower water reservoir.

The electrical energy produced is intended to supply the building equipped with the device, for example to supply energy to a supplementary electrical heating system. There is no provision for sending at least some of the electrical energy produced to a public electricity network, and the investment cost for installing the energy recovery device remains high, in particular because it is necessary to provide two artificial water reservoirs for each building. Moreover, storing large quantities of water at a height is subject to constraints and additional costs, since the usual standards for the maximum load on an inhabited building structure, of the order of 350 kilograms per square meter ($kg/m^2$), prevent providing a mass of water sufficient to obtain a significant effect. Indeed, considering a private house of 100 square meters ($m^2$), for example, it would not be possible to provide an upper water reservoir of more than 35 cubic meters ($m^3$), which could not create sufficient potential energy. The creation of a dedicated structure that is sufficiently strong to resist the required load and that can store at a height above ground, for example at a height of 10 meters (m), a significant volume of water, for example of the order of 1200 $m^3$, amounts to constructing a water tower with very severe constraints in respect of strength of materials, and that is therefore not cost effective. That method implies operation that is complex, making it necessary to monitor the levels of many higher and lower water reservoirs at a time and, given the various risks linked to seismology and terrorism, implies great difficulty of implementation. In all, because of the constraints that it imposes and the costs that it implies, that method is not appropriate for use on a large scale.

Document DE 2 928 476 A1 describes an installation for producing electrical energy by collecting waste water in a private house. A collection water reservoir is placed at the bottom of the house and is connected by a pipe to a waterwheel and then to a water reservoir situated lower down and enabling either discharge to a drain or recycling by means of a pump to the collecting water reservoir. Such an installation associated with a private house requires dedicated excavation for the lower water reservoir and can generate only a few tens of watts of power, and consequently can provide only a derisory quantity of daily supplementary energy, less than 1 kilowatt-hour (kWh).

Document EP 0 599 691 describes an installation for producing electrical energy that consists of a pumped-storage hydro-electric generating system using an upper water reservoir situated at ground level and constituted by a natural body of water or an underground body of water at a first depth, and a lower water reservoir in the form of an underground tunnel at a greater depth than the first water reservoir. The cost of the works for producing underground voids is very high. Those voids must be situated at great depths and reinforced to resist the pressure and erosion created by regular and powerful hydraulic flows, which increases commensurately the cost of implementing this method.

DEFINITION AND OBJECT OF THE INVENTION

The present invention aims to remedy the above-mentioned drawbacks and to act selectively in peak periods, i.e. at times of high demand for electrical energy, to provide supplementary electrical energy in significant quantities to an electricity distribution network, while minimizing the cost of producing the infrastructures for generating electricity by a pumped-storage hydro-electric generating system and enabling supplementary electrical energy production installations to be used in urban areas as close as possible to the sites where electrical energy is consumed.

Thus the invention aims to enable supplementary electrical energy to be produced on an industrial or semi-industrial scale greatly exceeding the production capacities linked to an individual dwelling and without needing dedicated civil engineering works.

The method of the invention also aims to enable environmentally friendly energy sources to achieve economic equilibrium by storing electrical energy produced during peak production periods and releasing it during peak consumption periods without adding considerable investments incompatible with the overall economic equation that those installations must comply with. The possibility of reselling the electrical energy produced in this way during periods when demand is highest and the price is therefore highest very significantly improves the profitability of such solar or wind renewable energy production installations.

The method and the installation of the invention also aim to avoid the overloads that the operators of electrical energy networks find difficult to manage and to absorb when solar or wind energy production systems come into operation at full output because appropriate weather conditions (strong sunlight or high winds) are suddenly combined. Without such complementary methods, the development of renewable energy production methods such as solar and wind methods will be significantly slowed down and, without considerable subsidies that are costly for the budgets of states attempting to encourage the emergence of these alternative energies, they will find it difficult to become competitive with conventional energy production methods.

The invention further aims to create synergy and to improve the strength, user-friendliness, or thermal balance of constructions for public, commercial or private use.

The invention achieves the above aims by providing an installation for producing supplementary electrical energy for an electricity network, including at least first and second water reservoirs, the first water reservoir being situated at a first level and the second water reservoir being situated at a second level lower than the first level with a level difference of at least 5 meters, at least one communicating pipe between the first water reservoir and the second water reservoir having a slope of at least 3% and being provided with at least one remote-controlled valve, a hydro-electric generating system, a pumping installation, and a control circuit, the installation being characterized in that at least one of said first and second water reservoirs comprises one or more individual reservoirs that are integrated in underground or semi-underground manner in the foundations of artificial buildings that need to be built for a primary function of sheltering goods or people independently of a secondary function of producing electricity, in that said water reservoir integrated in underground or semi-underground manner in the foundations of artificial buildings has a cumulative volume in the range 1000 m$^3$ to 150,000 m$^3$, in that the other one of said first and second water reservoirs is likewise situated at ground level using a natural slope of the ground, and in that the hydro-electric generating system has a power rating in the range 100 kW to 4 megawatts (MW).

The artificial buildings preferably have a primary function of housing, offices, car parks, businesses, warehouses, factories, or cultural or sporting premises.

In one particular embodiment, the first water reservoir is integrated in underground or semi-underground manner in the foundations of a first artificial building that needs to be built for a primary function of sheltering goods or people independently of a secondary function of producing electricity, and the second water reservoir situated at ground level using a natural slope of the ground is integrated in underground or semi-underground manner in the foundations of a second artificial building that needs to be built for a primary function of sheltering goods or people independently of a secondary function of producing electricity.

According to one particular aspect of the invention, which exploits the fact that at least one individual reservoir is integrated in underground manner in the foundations of artificial buildings, at least one individual reservoir that is integrated in underground manner in the foundation of artificial buildings also cooperates with an air-conditioning or refrigeration installation for some or all of said artificial buildings or associated buildings, said air-conditioning or refrigeration installation including at least one condenser fed with water from said individual reservoir, an expander, an evaporator fed with a heat-exchange fluid, and a compressor unit.

According to another particular aspect of the invention, which also exploits the fact that at least one individual reservoir is integrated in underground manner in the foundations of artificial buildings, at least one individual reservoir integrated in underground manner in the foundations of artificial buildings also cooperates with an installation for heating some or all of said artificial buildings or associated buildings, said heating installation including at least one condenser fed with water from a heating circuit, an expander, an evaporator fed with water from said individual reservoir, and a compressor unit.

Such features provides synergy in the search for energy saving and regulation of the production of electrical energy, over and above the synergy already achieved by integrating a water reservoir in the foundations of a building.

In one possible particular embodiment, one of said first and second water reservoirs is situated outside buildings and constitutes a natural or artificial body of water near ground level.

This water reservoir situated outside a building advantageously consists of an artificial lake, a water purification reservoir, or a natural body of water such as a lake, a watercourse, or the sea.

In one particular embodiment, said difference in level lies in the range 5 meters to 8 meters. The turbine of a hydro-electric generating system may then be situated at the level of the second water reservoir, but may optionally and equally well be situated in the vicinity of the first water reservoir, should this prove advantageous, for example for reasons of integration into the environment.

In another particular embodiment, said difference in level is greater than 8 meters. The hydro-electric generating system and the pumping installation may then be situated in the immediate vicinity of the second water reservoir. However, the hydro-electric generating system and the pumping installation may equally well be situated at the elevation of said second water reservoir, but be away from said second water reservoir.

In one particular embodiment, the control circuit includes a unit for coupling the pumping installation to said distribution network during periods of low electricity consumption and a unit for coupling the hydro-electric generating system to said distribution network during periods of peak electricity consumption.

According to another aspect of the invention, the control circuit may include a unit for coupling the pumping installation to a source of environmentally friendly natural energy, such as solar energy or wind energy, during periods of low electricity consumption, and a unit for coupling the hydro-electric generating system to said distribution network during periods of peak electricity consumption.

The water reservoir integrated in underground or semi-underground manner in the foundations of artificial buildings may comprise a plurality of individual reservoirs disposed in separate buildings and interconnected by a balancing pipe.

The water reservoir integrated in underground or semi-underground manner in the foundations of artificial buildings may include at least one individual reservoir also connected to a natural-cooling, sprinkler, cleaning, or firefighting installation.

A liquid level sensor is associated with each individual reservoir of a water reservoir integrated in underground or semi-underground manner in the foundations of artificial buildings.

The water reservoir integrated in underground or semi-underground manner in the foundations of artificial buildings may comprise one or more individual reservoirs, each having an underground depth less than or equal to 12 m and a superstructure portion with a height less than or equal to 3 m.

The water reservoir integrated in underground or semi-underground manner in the foundations of artificial buildings may include deep foundations attached to tanking defining a watertight water reservoir with a set of compartments closed by a floor.

By way of example, the water reservoir integrated in underground or semi-underground manner in the foundations of artificial buildings may have a lateral wall thickness lying in the range 20 centimeters (cm) to 45 cm and a bottom thickness lying in the range 10 cm to 25 cm.

According to one aspect of the invention, the installation includes a computer-based device for controlling the remote-controlled valves associated with the first water reservoirs and the hydro-electric generating systems as a function of immediate requirements for supplementary electrical energy and the level of water in the water reservoirs.

The invention also provides a method of producing supplementary electrical energy for an electricity network, the method comprising at least a first step of using a first source of electrical energy to drive a pumping installation in order to pump water from a second water reservoir situated at a second level to a first water reservoir situated at a first level higher than the second level with a level difference of at least 5 meters and a slope of at least 3%, and a second step of feeding a hydro-electric generating system from said first water reservoir, the method being characterized in that it includes a preliminary step of providing at least one of said first and second water reservoirs from at least one individual reservoir situated in the underground or semi-underground lower portion of artificial buildings that need to be built for a primary function independently of a secondary function of producing electricity, said water reservoir integrated in underground or semi-underground manner in the foundations of artificial buildings having a cumulative volume in the range 1000 m³ to 150,000 m³, the other one of said first and second water reservoirs likewise being situated at ground level using a natural slope of the ground, and the hydro-electric generating system having a power rating in the range 100 kW to 4 MW.

In one implementation, water is pumped from the second water reservoir and the hydro-electric generating system is fed with water from the first water reservoir at least partly via common pipe for two-way flow of fluid.

In another implementation, water is pumped from said second water reservoir via a first communicating pipe equipped with at least one remote-controlled valve and the hydro-electric generating system is fed with water from said first water reservoir via at least one second communicating pipe equipped with at least one remote-controlled valve.

In a method of one advantageous implementation of the invention, at least one water reservoir integrated in the foundations of a building further constitutes a hot source for an air-conditioning or refrigeration installation or a cold source for an installation for heating some or all of said artificial buildings or associated buildings, said air-conditioning or refrigeration installation and said heating installation each including at least one heat pump.

In a method of one particular implementation of the invention, at least the second water reservoir is situated in the underground or semi-underground lower portion of artificial buildings that need to be built for a primary function independently of a secondary function of producing electricity and the electrical energy produced by a hydro-electric generating system associated with said second water reservoir is used at least in part to supply electrical energy locally to an artificial building having said second water reservoir situated in the lower portion thereof or to an associated building situated in the immediate vicinity of that artificial building.

BRIEF DESCRIPTION OF THE DRAWINGS

Other features and advantages of the invention emerge from the following description of particular embodiments of the invention, given by way of example, and described with reference to the appended drawings, in which:

FIGS. 3 and 4 are views in elevation of two examples of installations of the invention, each including a plurality of first water reservoirs;

DETAILED DESCRIPTION OF PREFERRED EMBODIMENTS

Figure 1:
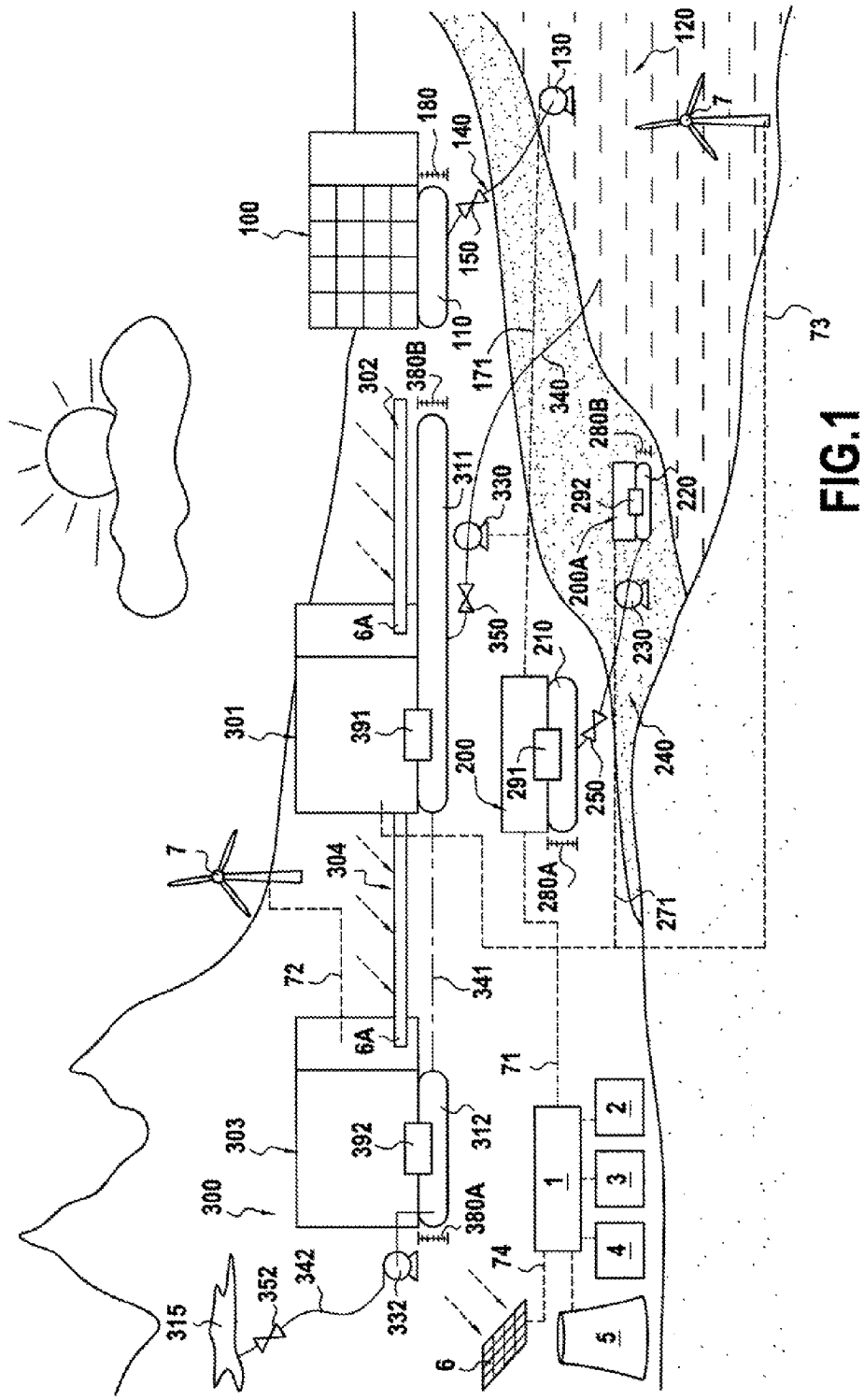
FIG. 1 is a diagrammatic overall view of installations for producing supplementary electrical energy for an electricity network in accordance with the invention.

FIG. 1 shows various examples of an electrical energy production installation of the invention.

A control station 1 of an electricity network manages the production of electricity by various conventional generator systems 2 to 5 producing electrical energy from fossil fuels (coal, oil, gas) or nuclear fuels. Such conventional generator systems have the disadvantage of being inflexible in operation and therefore of not being able to adapt easily to variations in demand, in addition to having drawbacks for the environment. Finally, they rely on non-renewable fossil fuels that are becoming exhausted.

Electrical energy production sources 6, 7 employing renewable natural energy, such as wind, sun, geothermal or tidal energy, are thus added to more conventional energy sources to produce additional electrical energy. By way of example, FIG. 1 shows an installation 6 for producing electrical energy from solar energy and onshore and offshore wind farms 7. In FIG. 1, the electrical connections between the energy sources and the control station 1 are represented in dashed lines. For example, there are shown an electrical connection 73 between an offshore wind turbine 7 and the control station 1 and an electrical connection 74 between solar panels 6 and the control station 1. Power lines 71 are similarly represented in dashed lines for supplying electricity to various buildings 200, 200A, 301 from the electricity network associated with the control station 1.

The drawback of renewable energies is that the production of electrical energy by such means is subject to climatic variations and cannot always be matched to periods of peak demand.

It is therefore desirable to be able to store temporarily the energy produced so as to be able to release that energy subsequently during periods of peak demand.

The invention utilizes the principle of generating electrical energy by means of pumped-storage hydro-electric generating systems, whereby during periods of low demand potential energy is accumulated by pumping and storing a volume of water in at least one upstream water reservoir 110, the energy needed for pumping being taken from energy from the electricity network 1 that is unused, and thus of low-cost, or being obtained directly or indirectly from available environmentally-friendly energy sources such as the above-mentioned energy sources 6, 7, and during periods of high demand this potential energy is transformed into kinetic energy to produce electrical energy by means of at least one hydro-electric generating system or micro-generator system 130, the water being fed to a downstream water reservoir 120 to await being pumped again during the next period of low demand.

For storage purposes, known installations of this type often employ natural pools that are sometimes very far from the areas of high energy demand.

In other circumstances an installation with artificial water reservoirs is created specifically for an application dedicated to the storage of potential energy and the creation of supplementary electrical energy. In such circumstances, constructing water reservoirs at a height or underground always implies very high levels of investment, which means that the equipment is not very cost-effective.

Moreover, integrating at least some of the upstream and downstream water reservoirs in buildings designed for other purposes is desirable, but until now has not led to concrete implementations because this process has numerous drawbacks, notably when integrating water reservoirs into the upper parts of buildings.

Various embodiments of the invention are shown in FIG. 1, in at least a first of which one upstream water reservoir 110 is created in the lower part of a building 100, that needs to be built for a particular first function other than the production of electricity or water management (for example car parks, offices, housing, cultural or sporting premises, warehouses, factories, etc.). Such buildings are thus not constructed only to provide a water reservoir, like a water tower, but have a different first vocation. Incorporating underground or semi-underground storage water reservoirs 110 in the foundations of buildings constitutes only a secondary vocation of the buildings. Because the foundations necessary for building the building also provide part of the infrastructure of the water reservoirs, and vice-versa, the additional cost of producing pumped-storage hydro-electric generating systems remains marginal, and it is sufficient to seek to locate the downstream water reservoir(s) situated in a low position elsewhere by benefiting from a difference in the level of the land.

The downstream water reservoir 120 may consist of an artificial lake that is preferably an existing natural body of water such as a lake, a watercourse, a sea, or an ocean.

Thus a single downstream water reservoir may be associated with a plurality of upstream water reservoirs analogous to the water reservoir 110 in FIG. 1. The downstream water reservoir 120 then constitutes a common reserve the volume of which is greater than or equal to that of all the upstream water reservoirs 110 with which this downstream water reservoir cooperates.

Respective liquid level sensors 180 are associated with the upstream water reservoirs 110 and where necessary the body of water constituting the common downstream water reservoir 120, in particular if that body of water does not have a volume very much greater than that of the upstream water reservoirs 110.

In one of the FIG. 1 embodiments, a hydro-electric micro-generator system 130 intended to receive water from an upstream water reservoir 110 is situated in the vicinity of the downstream water reservoir 120 in order to be able to place a turbine as close as possible to the maximum difference in level relative to the upstream water reservoir, at the bottom of a penstock 140 having a minimum of bends, at a place where the kinetic energy is at a maximum. Water leaving the turbine of the micro-generator system 130 is transferred via a secondary pipe to the common downstream water reservoir 120. A remote-controlled valve 150 is placed on the penstock 140.

In one possible embodiment, the hydro-electric generating system 130 may constitute a reversible machine in which the hydraulic part may operate equally well as a pump and as a turbine, while the electrical part may also operate equally well as a motor or an alternator. The generator may then operate with pipes for the two-way flow of fluid. Nevertheless, in other embodiments, a separate pumping system is coupled to the hydro-electric generating system. In the embodiments envisaged, two distinct communicating pipes may be used between an upstream water reservoir and a downstream water reservoir, one for the pump and the other for the turbine, to enable simultaneous pumping and driving of the turbine, if necessary. However, the use of a single common pipe for two-way flow of liquid may prove sufficient if it is necessary only to alternate driving the turbine and pumping.

In accumulation mode, the electrical energy supplied to the control station 1 via the lines 74 or 72, 73 from a solar farm 6 or a wind farm 7, for example, or directly via the electrical energy distribution system during periods of low consumption, powers the machine operating as a motor, which drives the pump to raise water from the downstream water reservoir 120 to the upstream water reservoir 110 corresponding to the hydro-electric generating system concerned and to build up potential energy. In release mode, the turbine receiving the kinetic energy of the water flowing in the penstock 140 drives the alternator, which produces electrical energy sent to the control station 1 via lines 171.

Different turbines may be used as a function of the head of water and the flow rate. Kaplan, Francis, or Pelton turbines may be used, for example, which satisfy demand in most circumstances. Using other, more specific types of hydro-electric generating systems, for example Turgo or Banki turbines, is not ruled out, however.

As a general rule, for hydro-electric generating systems rated in the power range 100 kW to 1 MW, it is preferable to use separate turbines and pumps for hydraulic and economic reasons, although machines combining turbines and pumps may be envisaged, provided that the operating points are selected with care.

For powers in the range 1 MW to 4 MW, it is also usually preferable to use a turbine and a pump that are separate. In certain circumstances, it is nevertheless possible to use a turbine coupled to a pump, for example a so-called "Deriaz" turbine.

Each hydro-electric generating system 130 also includes control and monitoring units.

The communication penstock 140 between the water reservoir 110 and the water reservoir 120 has a slope of at least 3% and preferably greater than 5% and a difference in level of at least 5 meters and preferably in the range 10 m to 50 m, a greater difference in level being possible if the topography of the environment allows, of course.

The penstock may preferably have a diameter in the range 0.3 m to 1 m and be made of steel or of concrete, for example, or of a plastics and/or a fiberglass material. The characteristics are a priori the same for each of the pipes if two separate one-way pipes are used for driving a turbine and for pumping.

The water reservoir 110 may have a volume of at least 500 m$^3$, but may preferably have a much greater volume, for example in a range of the order of 5000 m$^3$ to 30,000 m$^3$. Moreover, it is possible to use a plurality of water reservoirs installed in the foundations of different buildings and connected to one another, as indicated below.

Remote-controlled valves 150 are situated on pipes connecting the upstream water reservoirs 110 to the hydro-electric generating systems 130, to the output of the water reservoirs 110, or to the input of the hydro-electric generating systems 130. Remote-controlled valves may also be placed beyond the hydro-electric generating systems 130.

For implementations with a low head of water, in the range of the order 5 m to 8 m, the suction head of the turbines and the locations of the pieces of equipment enable direct connection to a body of water subject to access the open air, for example by means of a simple canal or a non-pressurized pipe, thus in the immediate proximity of the upstream water reservoir and where appropriate at its level.

It should be noted that for water heads greater than about 8 m, i.e. greater than atmospheric pressure, the turbines must imperatively be at the elevation of the downstream water reservoir 120, but not necessarily in the immediate proximity of that downstream water reservoir 120. It is therefore possible to locate the turbine and the whole of the hydro-electric generating system remotely so that it is in technical premises, underground or not, at the same level as the downstream water reservoir 120, such as a river, without being directly on the bank of that river, and therefore without being directly in the vicinity of the downstream water reservoir 120, but being underground under the upstream water reservoir 110, for example.

Embodiments are described below in which a hydro-electric generating system is used that is common to a plurality of upstream water reservoirs integrated into different buildings and disposed at substantially the same level. This makes it possible to rationalize the design and to reduce construction and maintenance costs by concentrating the production of electrical energy in a single hydro-electric generating system cooperating with a plurality of upstream water reservoirs. There is then only one connection to the control and transformation station 1 of the main electricity network.

Still referring to FIG. 1, there can be seen another embodiment of the invention in which an upstream water reservoir 210 is made in the foundations of the building 200, as in the above-described embodiment, but a downstream water reservoir 220 is also made in the same way in the foundations of another building 200A which are at a lower altitude below the level of the foundations of the first building 200.

In this configuration, the upstream water reservoir 210 and the downstream water reservoir 220 may each advantageously be associated with an air-conditioning and/or heating installation including a heat pump 291, 292, as explained below, but it is naturally equally possible to associate only one of the water reservoirs 210 or 220 with such an air-conditioning and/or heating installation, and likewise the water reservoir 110 described above could equally be associated with a heat pump if appropriate.

The upstream water reservoir 210 and the downstream water reservoir 220 communicate via at least one pipe 240 equipped with a remote-controlled valve 250. A hydro-electric generating system 230 including a turbine and a pumping installation, which may be placed in the vicinity of the downstream water reservoir 220, is arranged on the pipe 240. The hydro-electric generating system 230 has the same function as the hydro-electric generating system 130 and is connected to the control station 1 of the electricity network via a line 271. Liquid level sensors 280A, 280B are associated with each of the water reservoirs 210 and 220.

In the embodiment with the upstream water reservoir 210 and the downstream water reservoir 220 integrated into the foundations of buildings, the particular situation may be considered where the downstream water reservoir 220 constitutes a hot source for an air-conditioning installation for all or part of the building 200A or adjoining associated buildings, the air-conditioning installation including at least one heat pump 292.

In a similar way, the upstream water reservoir 210 could have the same function vis-à-vis an air-conditioning installation of the building 200. However, from a thermal point of view, it may be advantageous for the upstream water reservoir 210 to exercise the cold source function for an installation for heating all or part of the building 200 or adjoining associated buildings, the heating installation including at least one heat pump 291.

The downstream water reservoir 220 could naturally also exercise the function of a cold source for an installation for heating all or part of the building 200A or adjoining associated buildings, the heating installation including at least one heat pump 292.

Figure 2:
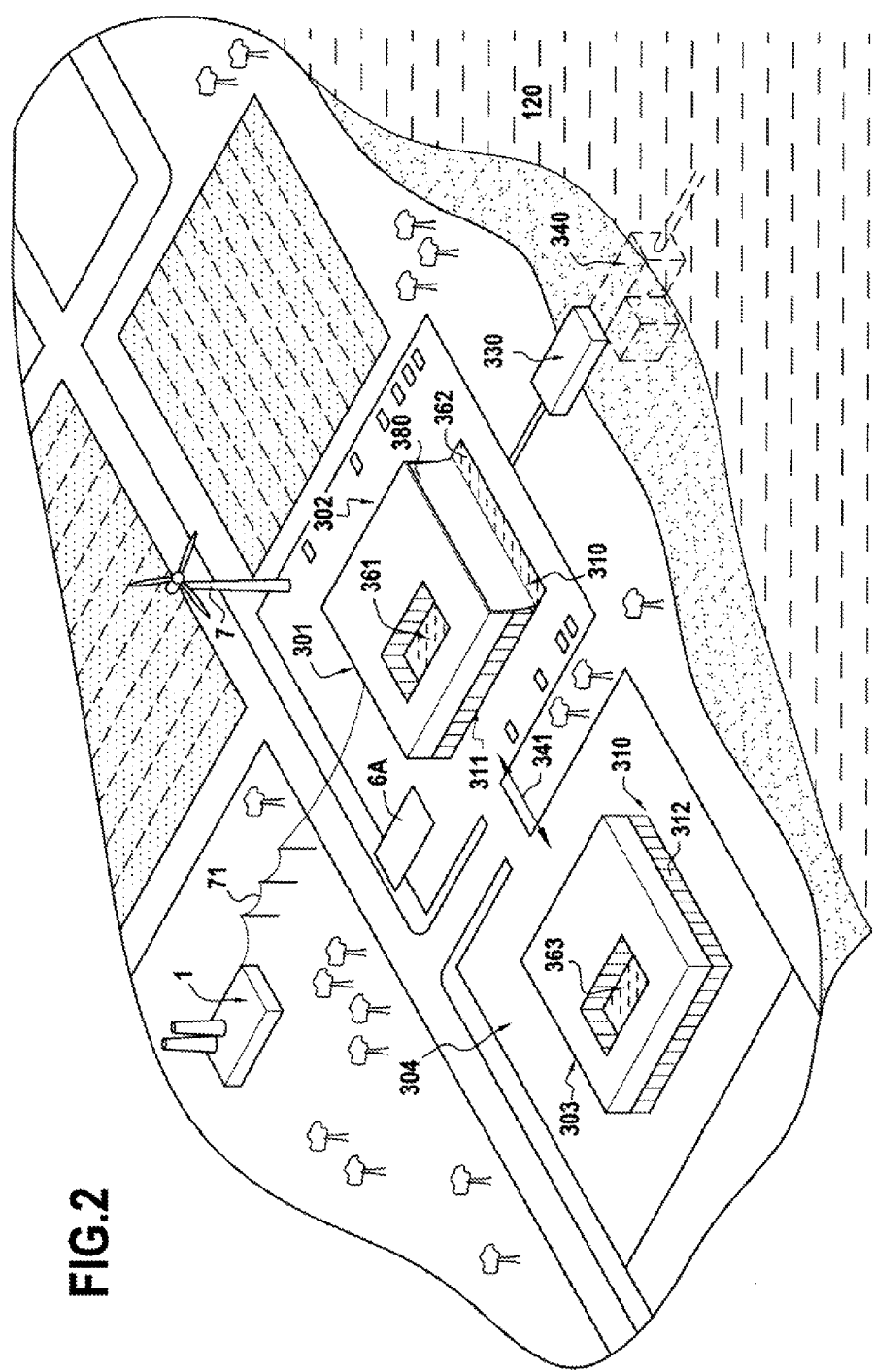
FIG. 2 is a diagrammatic overall perspective view of one possible embodiment of an installation for producing supplementary electrical energy for an electricity network.

Still referring to FIG. 1, and to FIG. 2, there can be seen another example of an installation of the invention that includes a multipart upstream water reservoir 310 including a first individual reservoir 311 placed in the foundations of a first building 301, which may be any type of artificial building having the function of receiving goods or people, and which also extends under a car park 302 surrounding the building 301, and at least one second individual reservoir 312 placed in the foundations of another building 303 that may optionally be of the same type as the first building 301. The two individual reservoirs 311 and 312, which are situated at substantially the same level, are interconnected by a balancing pipe 341. The first individual reservoir 311 is connected to a penstock 340 that discharges into a downstream water reservoir 120 situated at a level lower than all of the individual reservoirs 311, 312 and of volume that is greater than or equal to the sum of the volumes of the individual reservoirs 311, 312. Thus the downstream water reservoir 120 advantageously consists of a natural or artificial body of water in the vicinity of ground level, for example a lake, a river, the sea, or a water-purifying reservoir.

A hydro-electric generating system 330 that is connected by a line 371 to the control station 1 of the electricity network and includes a turbine and a pumping installation and a remote-controlled valve 350 connected to a control module enable production of electrical energy when water flows selectively in the penstock from the individual reservoirs 311, 312 to the downstream water reservoir 120 during periods of peak electricity demand on the network and to pump water up from the downstream water reservoir 120 to the upstream individual reservoirs 311, 312 during periods of low electricity demand.

As indicated above, if the differences in level between the individual reservoirs 311, 312 and the downstream water reservoir 120 are relatively small, in practice in the range 5 meters to 8 meters, the hydro-electric generating system 330 may be placed substantially at the level of the individual reservoirs 311, 312. This is equally applicable to the other embodiments. In the above-described third embodiment, regardless of the difference in level, it is also possible to install the hydro-electric generating system 330 at the level of the downstream water reservoir 120. Moreover, the individual reservoirs 311, 312 are equipped with level sensors 380A, 380B like the water reservoirs of the above-described embodiments.

FIGS. 1 and 2 show buildings 301 and 303 associated with car parks including protective awnings equipped with solar panels 6A that may contribute to supplying energy to the pumping installation of the hydro-electric generating system 330, on the same terms as other environmentally friendly energy sources 6, 7 or the electricity network in a period of low demand.

FIG. 1 also shows individual reservoirs 311, 312 that may serve as hot sources for an air-conditioning installation including a heat pump 391, 392 or as cold sources for a heating installation also including in a similar way a heat pump 391, 392. Here the air-conditioning or heating installations are shown as being used directly by the buildings 301 and 303 at the base of which the water reservoirs 311 and 312 are formed, and which may be commercial centers or office buildings, for example, although the air-conditioning and heating installations could also be situated in ancillary buildings adjoining the buildings 301 and 303.

In FIG. 2 it can be seen that if the individual reservoirs 311, 312 constituting the upstream water reservoir 310 are formed in the foundations of the buildings 301 and 303 and constitute essentially enclosed spaces, they are compartmented and the parts 361, 362 of the individual reservoir 311 and a part 363 of the individual reservoir 312 are open to the atmosphere in order to provide ancillary functions such as natural cooling or misting, for example. Other examples of additional functions of the water contained in the individual reservoirs of the upstream water reservoir are referred to below.

FIGS. 3 and 4 show in elevation an example of an installation of the invention in which only the water reservoirs and their connections are shown, even though they are designed to be integrated into the foundations of buildings intended for uses other than the production of energy alone.

In FIGS. 3 and 4 there can be seen a downstream water reservoir 420 and a multipart upstream water reservoir 410 including a main individual reservoir 411 and a series of auxiliary individual reservoirs 412 to 415, situated at the same level as the main individual reservoir 411 and interconnected by balancing pipes 416 to 419. There are shown five individual reservoirs 411 to 415 in all, but this number is not limiting on the invention and it is entirely possible to use a smaller or greater number of individual reservoirs, for example a total of ten individual reservoirs. A turbine 432 is situated above the downstream water reservoir 420 and receives the flow of water flowing in a penstock 442 originating in the main individual reservoir 411 and on which is placed a remote-controlled valve 451. A pump 431 situated at the level of the downstream water reservoir 420 discharges water into a pipe 441 that is equipped with a check valve 452 and that may optionally partially coincide with the penstock 442. An additional pipe 443 provided with a drain valve 453 may be disposed in parallel with the penstock 442.

The FIG. 3 embodiment differs from the FIG. 4 embodiment only in the presence of a downstream water reservoir 420 in two parts including a first water reservoir 421 of limited area associated with a spillway 422.

In FIGS. 3 and 4 there is also symbolically represented a control circuit 460 for coupling the pumping installation 431 to the distribution network via lines 461, 471 and the control station 1 during periods of low electrical energy consumption and for coupling the hydro-electric generating system 432 to the distribution network via lines 462, 471 and the control station 1 during periods of peak electricity consumption. There are also shown in FIGS. 3 and 4 a control line 463 of the remote-controlled valve 451 and an optional line 474 for receiving electricity produced locally, for example by solar panels 6A or wind turbines 7 for supplying energy locally to the control circuit 460 and to the pump 431 via the line 461, to supply energy in addition to or instead of the electricity network managed by the control station 1. The electricity network may be a local, regional, national, or transnational network.

There are many variants of the invention. In particular, the hydro-electric generating system associated with a downstream water reservoir situated in the foundations of an artificial building may feed electricity to a conventional electricity network in periods of peak consumption, while draining an upstream water reservoir that was previously filled in a period of low consumption, but it may also enable the building or the associated buildings, such as car parks, for example, to be supplied with electricity in more independent manner. Independence is increased if renewable energy sources are used to drive the pumping device for filling at least one upstream water reservoir from a reserve of water situated in the downstream water reservoir. While the upstream water reservoir(s) is/are being drained, the electricity produced by the hydro-electric generating system may be used locally, for example to light premises or to charge the batteries of electric vehicles in the car park, other types of local use of the electrical energy naturally being possible.

Referring again to FIG. 1, there can be seen a further embodiment of the invention in which an upstream water reservoir 315 is constituted by a natural or artificial body of water independently of buildings and a downstream water reservoir is constituted by one or more water reservoirs 312, 311 that are integrated in underground or semi-underground fashion in the foundations of artificial buildings 303, 301 such as office buildings or commercial centers, for example. A penstock 342 connects the upstream water reservoir 315 to a hydro-electric generating system 332 that is situated at the level of the water reservoirs 312, 311. A remote-controlled valve 352 is situated on the penstock 342.

The present invention also lends itself to cascade arrangements. Accordingly, as shown in FIG. 1, the water reservoirs 311 and 312 may consist of downstream water reservoirs for a first installation using the upstream reservoir 315, such as a lake, for example, and the same water reservoirs 311 and 312 connected by the balancing pipe 341 may constitute individual reservoirs of an upstream water reservoir of another installation using the downstream water reservoir 120, such as the sea, a lake, or a river, for example. There is no limit on the number of individual reservoirs 311, 312, but there must always be at least one water reservoir in the installation that is integrated in underground or semi-underground fashion into the foundations of an artificial building, to reduce the costs of the infrastructures that are in part common to the building and to the water reservoir, to reinforce the mechanical structure of the base of the building, and also to offer the possibility of additional synergy by enabling the volume of water stored in these water reservoirs to exercise other functions, notably thermal functions, which are described in more detail below.

Figure 5:
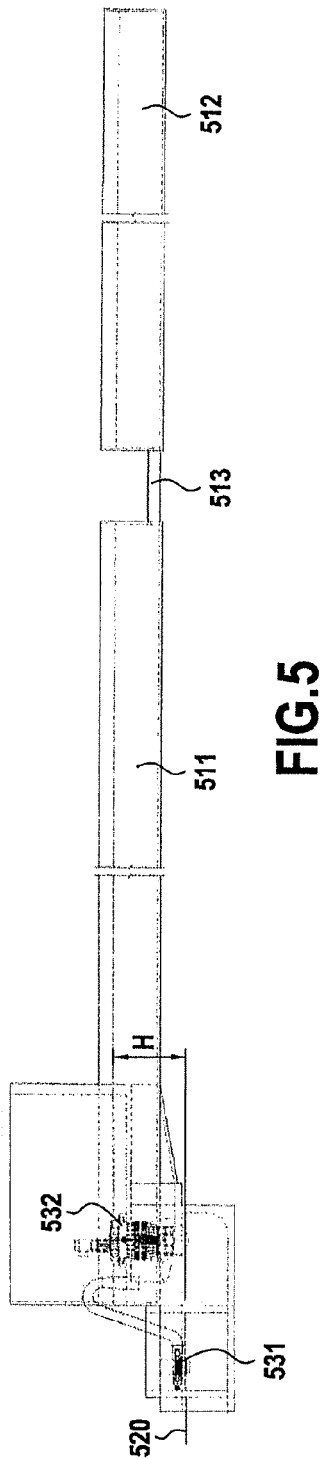
FIG. 5 is a view in elevation of one example of an installation of the invention including a particular pump-turbine system.

FIG. 5 shows a first upstream individual reservoir 511 connected by a balancing pipe 513 to a second upstream individual reservoir 512, the upstream individual reservoirs 511 and 512 being enclosed and included in the foundations of buildings that are not shown. For example, each of the upstream individual reservoirs 511 and 512 has a depth of 3 meters and a volume of 30,000 m³ or 15,000 m³, respectively. By way of example, a head H of 5 meters is defined between the upstream water level N1 in the upper individual reservoirs 511, 512 and a downstream water level N2 in a lower receiver 520, such as a river (see FIG. 6).

FIG. 5 shows an example of a pump 531 situated at the level of the lower receiver 520 and a turbine 532 that, given the low head of water, is situated near the first upper individual reservoir 511. The turbine 532 may thus be connected to the upper body of water by an open waterway such as a canal or a non-pressurized pipe.

Figure 6:
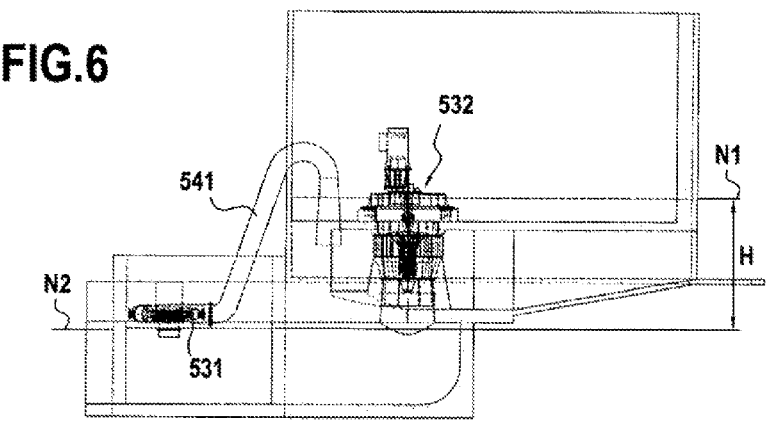
FIGS. 6 and 7 are detailed views in elevation and in plan, respectively, of the pump-turbine system of FIG. 5.
Figure 7:
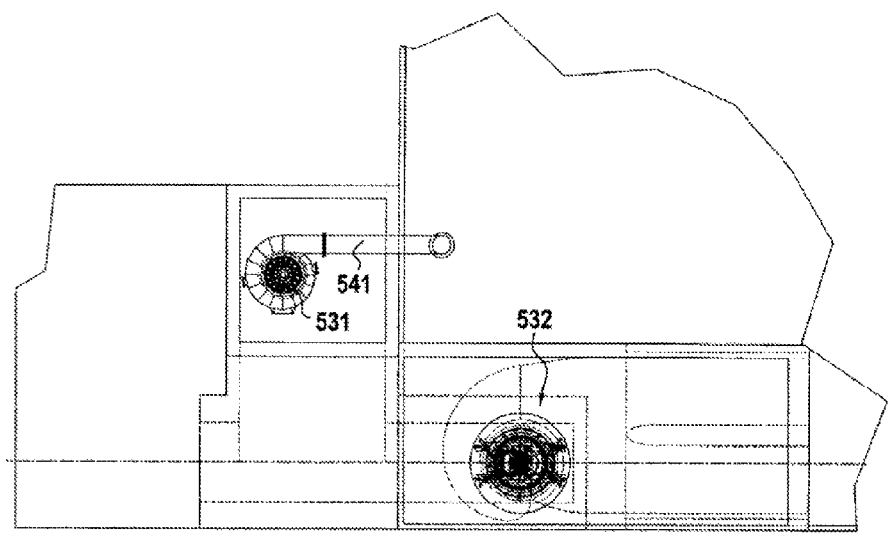

FIGS. 6 and 7 show on a larger scale and in elevation and in plan view the pump 531 with its discharge pipe 541 and the turbine 532.

If the water reservoirs also constitute hot or cold sources for air-conditioning or heating installations, it is possible to obtain groups of buildings that are particularly economical in terms of energy, since the volumes of water used to regularize the production of electrical energy also enable rationalization of the operation of the heating and air-conditioning installations and therefore a reduction in overall energy consumption. It is known in particular that supermarkets are very greedy of energy for air-conditioning and refrigeration, with the result that the presence in the same building or near it, for example under a car park, of an installation of the invention proves particularly beneficial. Each air-conditioning or heating installation may comprise a plurality of small heat pumps rather than a single heat pump of higher energy rating.

Figure 8:
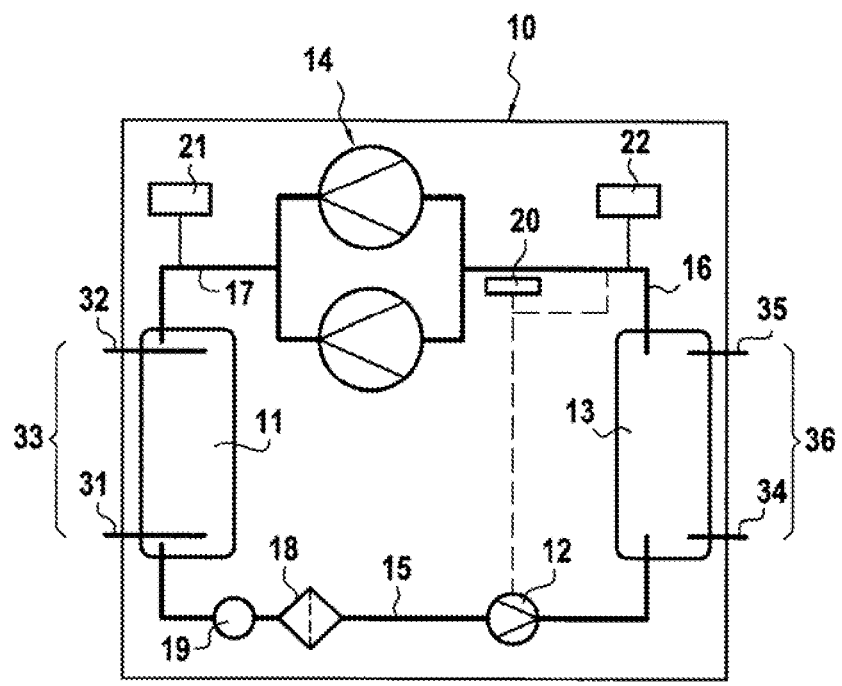
FIG. 8 is a refrigeration diagram of a clear water circuit with a heat pump that may be incorporated into an installation of the invention.

FIG. 8 shows the refrigeration diagram of an example of a clean water heat pump circuit 10 that may be used with an installation of the invention in which a water reservoir constituting a cold source 36 is installed in the foundations of a building provided with a heating circuit 33.

The heat pump 10 includes a refrigerant fluid flow circuit including at least one condenser 11 which itself includes a secondary circuit for exchanging heat including a water inlet 31 and a water outlet 32 that are connected to a heating circuit 33, an expander 12, an evaporator 13, which itself includes a secondary circuit for exchanging heat including a water inlet 34 and a water outlet 35 that are connected to an underground or semi-underground water reservoir 110; 210; 220; 311, 312 constituting the cold source 36, and a compressor unit 14.

More particularly, a filter 18 and an operating indicator 19 are seen on the line 15 connecting the condenser 11 to the expander 12. The line 16 connecting the evaporator 13 to the compressor unit 14 includes a temperature sensor 20 and a low-pressure sensor 22. The line 17 connecting the compressor unit 14 to the condenser 11 includes a high-pressure sensor 21.

All the components 11 to 22 constituting the heat pump 10 may be grouped together in a limited space because of the proximity of the reserve 36 of water and the heating circuit 33. In particular, the whole of the circuit for the refrigerant fluid, such as freon, may be confined in a reduced space and in underground or semi-underground technical premises close to the water reservoir 36, which is advantageous in terms of economic operation and safety. In particular, because of the short length of the refrigerant fluid pipes, energy losses are lower, the consumption of refrigerant fluid is low, and the refrigerant fluid flow circuit may be confined in a space far from areas of the buildings open to the public. It is easy to exchange heat with a liquid via the evaporator 13 and the temperature of the water situated in the water reservoir 36 is generally naturally adapted to the heat exchanges effected in the heat pump.

Figure 9:
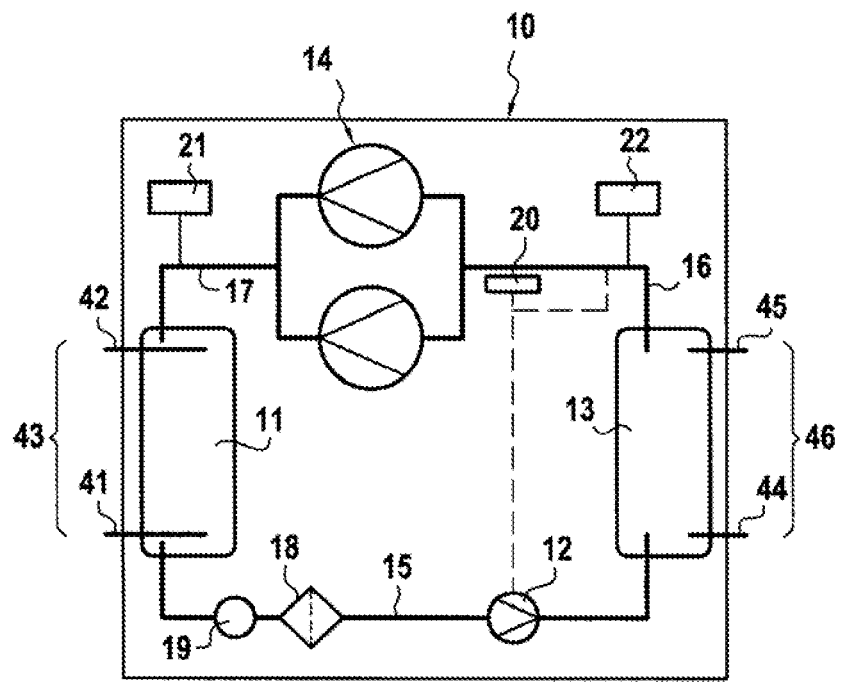
FIG. 9 is a refrigeration diagram of a circuit of a clear water condensation air conditioner that may be incorporated into an installation of the invention.

FIG. 9 shows the refrigeration diagram of an example of a heat pump circuit 10 constituting a clean water condensation air-conditioner that may be used with an installation of the invention, in which a water reservoir of water constituting a hot source 43 is installed in the foundations of a building provided with an air-conditioning installation, for example with refrigerated showcases 46.

The refrigeration diagram of the condensation air-conditioner 10 of FIG. 9 is very similar to that of the heat pump 10 of FIG. 8 and common elements carry the same references and are not described again. In the FIG. 9 diagram, the condenser 11 includes a water inlet 41 and a water outlet 42 connected to an underground or semi-underground water reservoir 110; 210; 311, 312 constituting a hot source 43 while the evaporator 13 includes an inlet 44 for a heat-exchange fluid, for example water and antifreeze, and an outlet 45 for the same heat-exchange fluid connected to a heat-exchange fluid circuit in the air-conditioning or refrigeration circuit 46.

As in the FIG. 8 heat pump, all the components 11 to 22 constituting the condensation air-conditioner 10 of FIG. 9 may be grouped together in a limited space because of the proximity of the reserve 43 of water and the cooling circuit 46. In particular, the condenser 11 may be installed in underground technical premises, which reduces the length of the refrigerant fluid circuit, reduces the quantity of refrigerant fluid needed, and confines this refrigerant fluid circuit in a space far from areas open to the public.

Note that given an individual water reservoir volume greater than approximately 500 m³, the quantity of water used for the operation of a heat pump or a condensation air conditioner is relatively low and the variations over time of the volume of water contained in a water reservoir 36 or 43 have no significant influence on the operation of the evaporator 13 in FIG. 8 or the condenser 11 in FIG. 9, all the more so since a residual water volume of the order of at least 200 m³ exists at all times in a water reservoir 36 or 43 in order to prevent depriming of the pump associated with the hydro-electric generating system. Provision may thus be made for conserving at all times some minimum depth of water in each water reservoir 36 or 43. However, even in the event of momentary lack of water in a water reservoir 36 or 43, although water is advantageous because of its thermal inertia, the heat exchange process within an evaporator 13 or a condenser 11 may continue if air is temporarily introduced via the inlets and outlets 34, 35 or 41, 42, so that the operation of the heating or air-conditioning installations may continue without risk.

Embodiments with a water reservoir integrated in the foundations of buildings are more particularly described below.

Figure 10A:
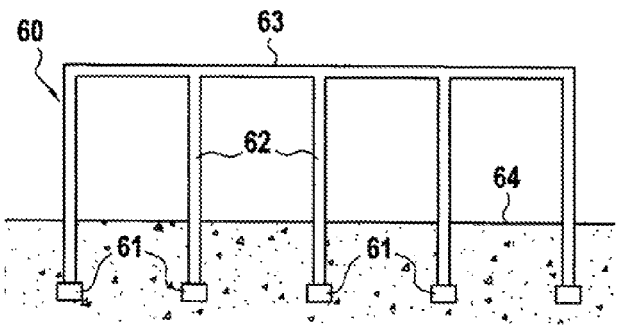
FIGS. 10A and 10B are diagrammatic views in section of conventional building structures.
Figure 10B:
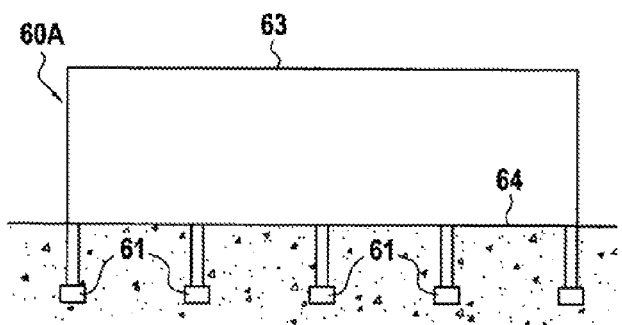

FIGS. 10A and 10B show examples of traditional buildings 60, 60A with no water reservoir, the buildings comprising a superstructure 63, a floor 64 at ground level, and foundations 61 in the form of piles anchored in the ground. FIG. 10A corresponds to clay soil requiring deep foundations 61 associated with pillars 62 for reinforcing the superstructure, while FIG. 10B corresponds to less unstable ground, such as sandy or chalky soil, nevertheless requiring semi-deep or deep foundations 61 but without it being essential to add pillars 62. Clay soils are characteristic of plateaus while sandy and chalky soils are characteristic of valleys or estuaries.

Figure 11A:
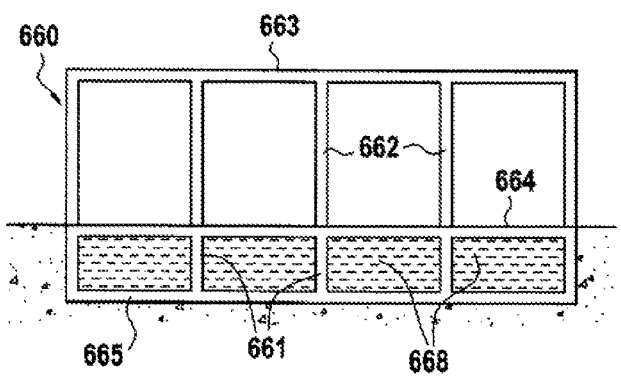
FIGS. 11A and 11B are diagrammatic views in section of examples of building structures equipped with water reservoirs of the invention.
Figure 11B:
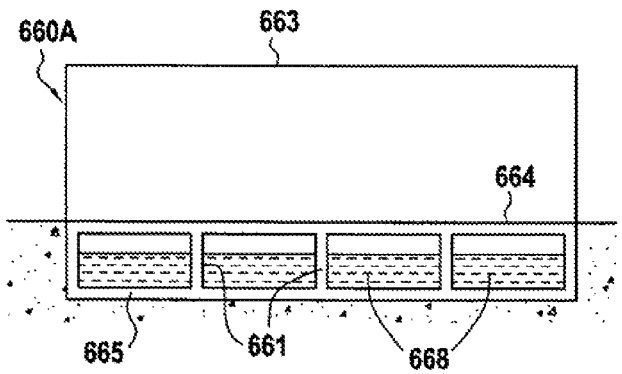

FIGS. 11A and 11B show examples of buildings 660, 660A on soils analogous to those of FIGS. 10A and 10B, respectively, but in which a water reservoir for water has been installed in the foundations as taught by the invention.

Thus there can be seen in FIG. 11A deep foundations 661 attached to tanking 665 defining a watertight water reservoir with a set of compartments 668 closed by a floor 664 and surmounted by pillars 662 supporting the superstructure 663. The construction of the water reservoir as a whole does not impose civil engineering works significantly more complicated than the production of deep foundations, but the presence of tanking with a bottom consisting of a raft foundation and a compartmented water reservoir stiffens the whole of the structure and thus improves the quality of the building.

The FIG. 11B building is similar to the FIG. 11A building but has no pillars 662, given the nature of the terrain, which is less unstable.

In rocky or granite areas water reservoirs of greater area and lesser depth are preferred.

The water reservoirs integrated into the foundations of a building may have a lateral thickness in the range 20 cm to 45 cm for example, 30 cm for example, and a bottom thickness in the range 10 cm to 25 cm, 15 cm for example, which makes it possible to provide the necessary mechanical strength and at the same time to incorporate these walls into the foundations of a building without additional civil engineering costs.

As indicated above, the areas and volumes of the water reservoirs may have various values as a function of the configuration of the buildings and the energy required from the installation. Thus relatively small individual reservoirs integrated into buildings may be envisaged, for example of 1200 m³ capacity (for example 2 m×20 m×30 m), 2400 m³ capacity (for example 2 m×30 m×40 m), or 4800 m³ capacity (for example 2 m×40 m×60 m), but the individual reservoirs may also be larger, notably if excavations are carried out in areas of commercial, craft, industrial, or service-sector activities. A large main individual reservoir may be then be provided, of 30,000 m³ capacity for example (3 m×100 m×100 m for example), and one to ten auxiliary individual reservoirs with an average size of 15,000 m³ for example (3 m×50 m×100 m for example).

Each individual reservoir integrated into the foundations of a building preferably has an underground depth less than or equal to 12 m and a superstructure portion less than or equal to 3 m high. The tanking is thus not fundamentally different from that of a standard swimming pool, for example, but the volume of water of at least a major part of each underground or semi-underground water reservoir will be enclosed for safety reasons.

Depending on the topography of the terrain, the head H between an upstream water reservoir and a downstream water reservoir may typically vary in the range 5 m to 100 m. These penstocks must have a slope of at least 3%. In practice, the head losses and efficiency are acceptable if a length of penstock is chosen that is at most of the order of twenty times the head. As a function of the volume of water available in the upstream water reservoirs (in the range 45,000 m³ to 180,000 m³, for example), flow rates may be available in the range 4.2 m³/s to 16.7 m³/s for example for penstock diameters in the range 1.45 m to 2.5 m, respectively. The generation of electrical energy in peak periods (of three hours estimated duration) could be in the range approximately 450 kWh to 37,700 kWh, in proportion to the volume of water in the upstream water reservoirs and the head.

Thus technical and economic optimization is obtained with a cumulative volume greater than approximately 70,000 m³ for the upstream water reservoirs and a head equal to or greater than 15 meters, but significant advantages may nevertheless be obtained from a volume in a range of the order of 500 m³ to 1000 m³ and a head of 5 meters. Thus installations of the invention are suited to generating energy in the range 100 kW to 4 MW and more particularly 300 kW to 4 MW.

In any event, the individual reservoirs remain of a size such that they may be integrated in the foundations of traditional buildings without it being necessary to call upon dam-building techniques and therefore without additional civil engineering investment compared to conventionally built buildings.

Driving the pumps naturally requires energy, but the pumping energy may be usefully obtained outside peak periods from environmentally friendly energies (solar or wind energy, for example) or from the electricity network itself in periods of low consumption either when the load on the network is insufficient or when using the available electrical energy smoothes consumption and therefore regularizes the operation of the network.

The type of turbine that is chosen depends essentially on the available head H. Thus Kaplan turbines are well suited to low heads, in the range of the order of 5 meters to 20 meters, while Francis or Pelton turbines are preferable for high heads, for example in the range of the order of 20 meters to 100 meters.

The length of the penstocks may be adapted to suit the environment. Thus short pipes may be used, with a length of the order of twice the head, or long pipes, up to approximately 2 kilometers long, which may follow the line of existing roads, for example. The section of the pipes may be in the range 0.3 m to 3 m, for example.

The balancing pipes between individual reservoirs, which are not pressurized, may be made of concrete, steel, PVC, or fiberglass-reinforced plastic. They produce little head loss and may have sections in the range 0.2 m to 2.5 m. The distance between two individual reservoirs of the same set of water reservoirs associated with the same hydro-electric generating system, i.e. the length of a balancing pipe, is preferably less than or equal to 1000 m.

Variants of the invention are described below with reference to FIGS. 12 to 16 in which the reserve of water has one or more functions in addition to the function of storing potential energy.

Note first that the presence of a large volume of water at the base of a building makes a strong contribution to regularizing the ambient temperature through a natural thermal inertia effect.

Moreover, given the movement of the water caused by repeatedly discharging in periods of peak energy demand and refilling in periods of low energy demand, the water is not stagnant in the water reservoir and causes no pollution problems.

Periods of low and peak energy demand may alternate within the same day, with the result that there are then daily to-and-from movements of at least some of the water between the water reservoir placed under a building and a second water reservoir placed at a different level.

However the invention also applies to filling and draining processes of greater amplitude, for example over periods of several days or several weeks, or even several months to take into account seasonal consumption peaks.

Moreover, the cumulative volume of water in a water reservoir is preferably greater than 1000 m$^3$ and preferably at least of the order of 10,000 m$^3$, or even ten times greater than this, with the result that the water from the water reservoir placed in a building may be used for other ancillary requirements requiring the presence of water but in relatively small quantities without affecting the function of a reserve of water for the requirements of creating potential energy.

Figure 12:
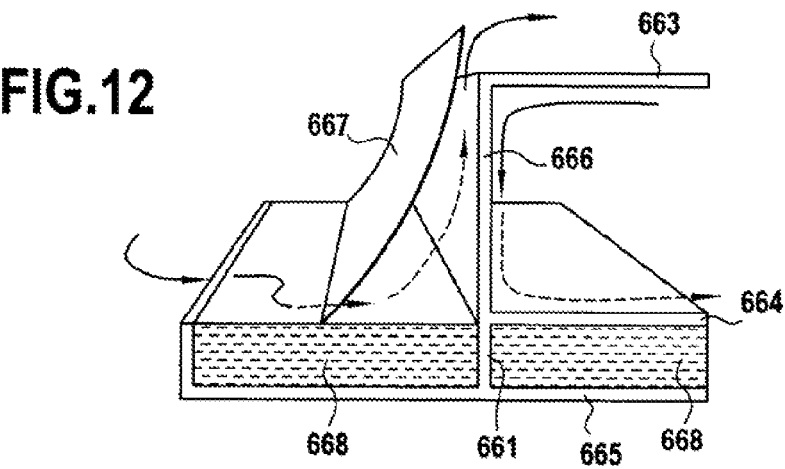
FIG. 12 is a diagrammatic perspective view showing an example of the bio-climatic frontage of a building equipped with an installation of the invention.

By way of example, FIG. 12 is a diagram showing the use of water from the compartments 668 of a water reservoir that has a bottom 665 and that is placed in the foundations 661 of a building having a floor 664, a front wall 666, and a ceiling 663, to create a bio-climatic frontage and to cool that frontage naturally. A compartment 668 of the underground water reservoir is placed outside the building, in front of the frontage, with an upper surface open to the atmosphere, and thus constitutes a retaining pool. An inclined wall 667, which may be transparent or translucent, is placed in front of the frontage and is sprayed with water, providing a space between this wall 667 and the frontage 666 so that hot outside air cooled by the running water recovered in this compartment 668 rises along the frontage 666 behind the inclined wall 667 to cool the frontage 666. Air heated at the level of the roof 663 may also be cooled inside the building because the floor 664 is over the mass of water in the remainder of the underground water reservoir under the building.

The wall of water created at the frontage and the open pool present in front of the frontage may naturally further create an esthetic effect in addition to the temperature regulation action.

Figure 13:
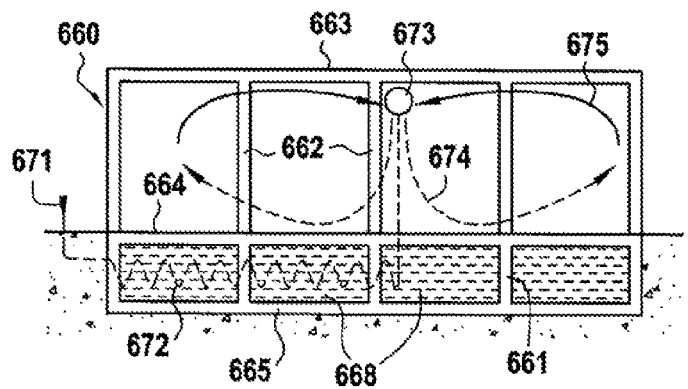
FIG. 13 is a diagrammatic view in section of an example of a building structure equipped with water reservoirs of the invention and producing a flow of cooling air.

FIG. 13 shows an example of reinforced natural ventilation obtained in a building 660 equipped with an underground or semi-underground water reservoir in accordance with the invention. The building may thus be cooled naturally by a system known as a Canadian well system that enables control of heat input.

Air from the outside is introduced via an inlet 671 into a network of pipes 672 that may take the form of coils and be placed on the bottom 665 of the water reservoir to enable cooling of the air by heat exchange with the water in the underground or semi-underground water reservoir. The cooled air in the pipes 672 is fed back into the inside of the building 660 via an outlet 673 placed high up, for example in the vicinity of the ceiling 663 in a central space of the building 660. The arrows 674 and 675 symbolically represent the path of the air, which first cools the atmosphere inside the building (arrows 674) before becoming heated (arrows 675) and evacuated to the outside from the upper part of the building. Thus a phenomenon of reinforced natural ventilation by convection is produced, without consuming water but by means of its presence.

Figure 14:
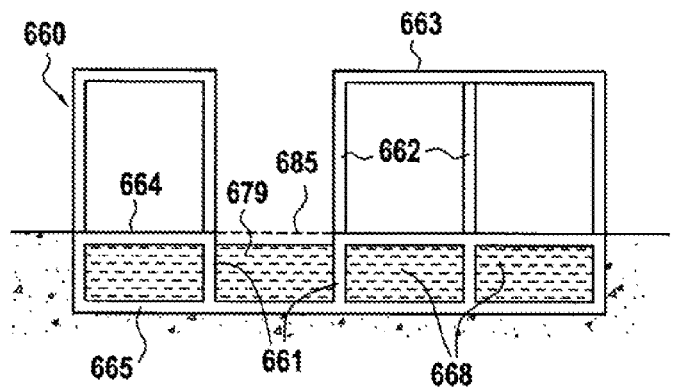
FIG. 14 is a diagrammatic view in section of an example of a building structure equipped with water reservoirs of the invention and including a cooling system employing a natural body of water.

FIG. 14 shows another example of natural cooling made possible by providing, as in the FIG. 2 embodiment, for a compartment 668 of the underground or semi-underground water reservoir a pool 679 open to the atmosphere that may serve various uses: swimming pool, decorative pool, misting effects, rainwater collection, etc. The fact that this open pool may be located in the heart of a building 660 also makes it possible to induce a temperature regulation effect. If required, the water surface open to the atmosphere is covered by a protective grating or grid 685 for safety reasons.

Figure 15:
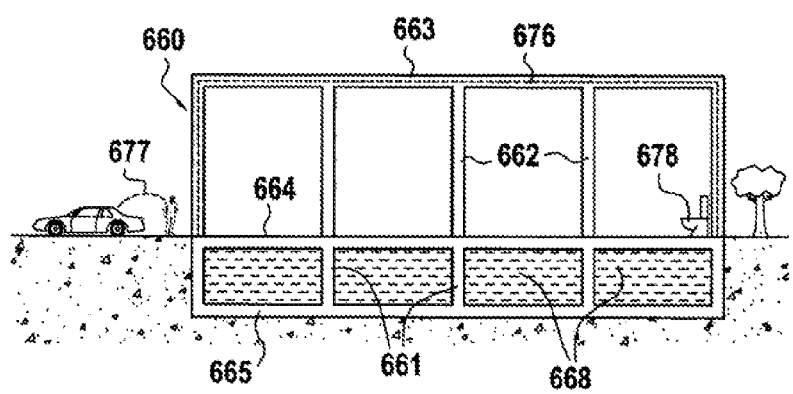
FIG. 15 is a diagrammatic view in section of an example of a building structure equipped with water reservoirs of the invention and incorporating a system for supplying the building with sanitation water.

FIG. 15 shows an embodiment that may employ all of the variants described above, but that further includes a network of pipes 676 placed in the superstructure of the building 660. The pipes 676 are fed with water from the compartments 668 of the water reservoir and may be used for all applications in which the use of rainwater is allowed: sprinklers, use as sanitation water in toilets 678, use in car wash installations 677 or other cleaning installations, etc.

Figure 16:
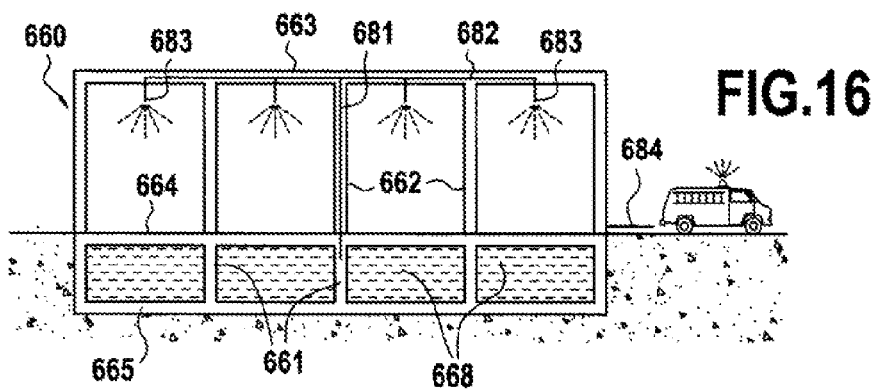
FIG. 16 is a diagrammatic view in section of one example of a building structure equipped with water reservoirs of the invention and incorporating a system for supplying water to fire points or sprinkler systems.

FIG. 16 shows a variant of the FIG. 15 embodiment, which may also be combined therewith. Water from at least some of the compartments 668 of the underground or semi-underground water reservoir under the building 660 feeds fire points 684 and/or a column 681 feeding a network of pipes 682 distributed over the roof or the walls of the building and feeding sprinkler systems 683 ready to be used in the event of fire.

As indicated above, the various embodiments described may be combined with each other. In particular, the underground or semi-underground water reservoir under a building may exercise, in addition to its primary function of storing potential energy, the function of producing natural cooling of the atmosphere inside the building at the same time as creating a cold source for a heating installation using a heat pump, or a hot source for a clean water condenser air-conditioning or refrigeration installation, not to mention the other complementary uses referred to above with reference to FIGS. 14 to 16.

The production of a storage water reservoir in the foundations of a building used to shelter goods or people, without additional civil engineering costs or with a marginal overcost, thus has a true synergistic effect, all the more so in that the presence of this pool enabling hydro-electric energy to be stored and able to optimize exchanges of thermal energy also mechanically strengthens the whole of the structure of the building.

Figure 17:
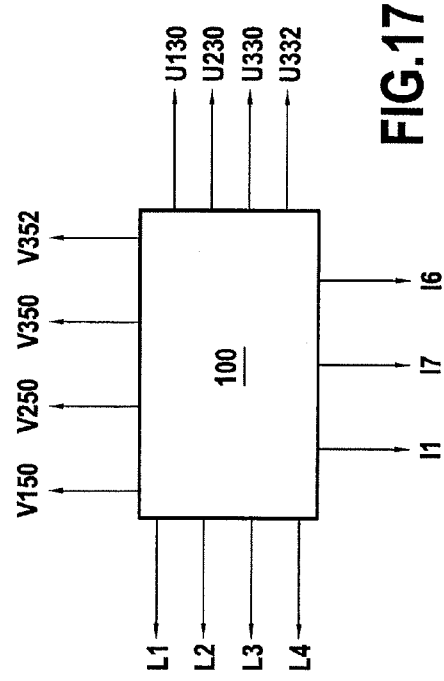
FIG. 17 is a block diagram of one example of a control system for installations of the invention.

There is described below, with reference to the diagram of FIG. 17, a general control circuit 100 that may be applied by way of example to the various embodiments described with reference to FIG. 1, but may also be adapted to other embodiments. The control circuit 100 constitutes a control device for the remote-controlled valves associated with the first individual reservoirs 110, 210, 311, 312, 315 and one or more hydro-electric generating systems 130, 230, 330, 332 as a function of immediate requirements for supplementary electrical energy and the water level in the first water reservoirs, as measured by the level sensors 180, 280A, 380A, 380B.

The control circuit 100 receives information L1, L2, L3, L4, L5 from level sensors 180, 280A, 280B, 380A, 380B, respectively, information I1 from a control station 1 indicating the requirement for supplementary electrical energy, information I6 indicating the solar energy available from a solar farm 6, information I7 indicating the wind energy available from a wind farm 7, and possibly information relating to other types of renewable energy available for the production of electricity, for example geothermal energy or tidal energy.

The control circuit 100 delivers control signals V150, V250, V350, V352 to remote-controlled valves 150, 250, 350, 352, respectively, and control information U130, U230, U330, U332 to the existing hydro-electric generating systems 130, 230, 330, 332, for turbine driving or pumping according to circumstances, which express a requirement for either supplementary electrical energy in the distribution network produced from the accumulated potential energy or electrical energy from renewable energies, or alternatively or additionally from standard energy sources in periods of low consumption, enabling the accumulated potential energy to be replaced by pumping.

Draining the upstream water reservoirs 110, 210, 311, 312, 315 by opening the associated remote-controlled valves may either be simultaneous for all the water reservoirs, although possibly partial, or else gradual and successive over time, an upstream water reservoir being opened as soon as another upstream water reservoir has been drained.

The control circuit 100 includes a central unit programmed to open the various remote-controlled solenoid valves as a function of detected electricity production requirements. The control circuit 100 also controls the filling of the upstream water reservoirs 110, 210, 311, 312 by pumping from the common downstream water reservoir 120 or the independent downstream water reservoir 220 in periods when excess electricity is produced by the network or by local systems, for example wind systems 7 and solar systems 6. The control circuit 100 also controls at least partial filling of the upstream water reservoir 315 by pumping from the water reservoir 312 when it has already been filled from the downstream water reservoir 120. However, the water reservoir 315 may also consist of a body of water that is fed independently, for example by rainwater, and the water reservoir 312 could also serve only as a downstream water reservoir without being connected to the water reservoir 311 by the pipe 341.

The invention naturally lends itself to diverse variants and specifically the embodiments described with reference to FIG. 1 in particular may be used independently of one another and connected to various control stations rather than necessarily to a single centralized control station.

The invention claimed is:

1. An installation for producing supplementary electrical energy for an electricity network, including at least first and second water reservoirs, the first water reservoir being situated at a first level and the second water reservoir being situated at a second level lower than the first level with a level difference of at least 5 meters, at least one communicating pipe between the first water reservoir and the second water reservoir having a slope of at least 3% and being provided with at least one remote-controlled valve, a hydro-electric generating system, a pumping installation, and a control circuit, the installation being wherein at least said first water reservoir comprises one or more individual reservoirs that are integrated in underground or semi-underground manner in the foundations of artificial buildings that need to be built for a primary function of sheltering goods or people independently of a secondary function of producing electricity, in that said first water reservoir integrated in underground or semi-underground manner in the foundations of artificial buildings has a cumulative volume in the range 1000 m$^3$ to 150,000 m$^3$, in that said second water reservoir is likewise situated at ground level using a natural slope of the ground, and in that the hydro-electric generating system has a power rating in the range 100 kW to 4 MW.

2. An installation according to claim 1, wherein said first water reservoir comprises said one or more individual reservoirs that are integrated in underground or semi-underground manner in the foundations of a first artificial building that needs to be built for a primary function of sheltering goods or people independently of a secondary function of producing electricity, in that said second water reservoir situated at ground level using a natural slope of the ground comprises one or more individual reservoirs that are integrated in underground or semi-underground manner in the foundations of a second artificial building that needs to be built for a primary function of sheltering goods or people independently of a secondary function of producing electricity, and in that each of said first and second water reservoirs has a cumulative volume in the range 1000 m$^3$ to 150,000 m$^3$.

3. An installation according to claim 1, wherein said at least first water reservoir that is integrated in underground manner in the foundations of artificial buildings also cooperates with an air-conditioning installation or refrigeration installation for some or all of said artificial buildings or associated buildings, said air-conditioning installation or said refrigeration installation including at least one condenser fed with water from said individual reservoir, an expander, an evaporator fed with a heat-exchange fluid, and a compressor unit.

4. An installation according to claim 1, wherein said at least first water reservoir that is integrated in underground manner in the foundations of artificial buildings also cooperates with an installation for heating some or all of said artificial buildings or associated buildings, said heating installation including at least one condenser fed with water from a heating circuit, an expander, an evaporator fed with water from said individual reservoir, and a compressor unit.

5. An installation according to claim 1, wherein said second water reservoir is situated outside buildings and constitutes a natural or artificial body of water at ground level.

6. An installation according to claim 1, wherein said difference in level lies in the range 5 meters to 8 meters and the hydro-electric generating system is situated in the vicinity of said first water reservoir.

7. An installation according to claim 1, wherein said difference in level is greater than 8 meters and the hydro-electric generating system and the pumping installation are situated at the elevation of said second water reservoir, but away from said second water reservoir.

8. An installation according to claim 1, wherein the control circuit includes a unit for coupling the pumping installation to said distribution network during periods of low electricity consumption and a unit for coupling the hydro-electric generating system to said distribution network during periods of peak electricity consumption.

9. An installation according to claim 1, wherein the control circuit includes a unit for coupling the pumping installation to a source of environmentally friendly natural energy, such as solar energy or wind energy, during periods of low electricity consumption, and a unit for coupling the hydro-electric generating system to said distribution network during periods of peak electricity consumption.

10. An installation according to claim 1, wherein said first water reservoir integrated in underground or semi-underground manner in the foundations of artificial buildings includes a plurality of individual reservoirs disposed in separate buildings and interconnected by a balancing pipe.

11. An installation according to claim 1, wherein said first water reservoir integrated in underground or semi-underground manner in the foundations of artificial buildings includes at least one individual reservoir also connected to a natural cooling, sprinkler, cleaning, or firefighting installation.

12. An installation according to claim 1, wherein a liquid level sensor is associated with each individual reservoir of said first water reservoir integrated in underground or semi-underground manner in the foundations of artificial buildings.

13. An installation according to claim 1, wherein said first water reservoir integrated in underground or semi-underground manner in the foundations of artificial buildings includes one or more individual reservoirs each having an underground depth less than or equal to 12 m and a superstructure portion with a height less than or equal to 3 m.

14. An installation according to claim 1, wherein said first water reservoir integrated in underground or semi-underground manner in the foundations of artificial buildings includes deep foundations attached to tanking defining a watertight water reservoir with a set of compartments closed by a floor.

15. An installation according to claim 1, wherein said first water reservoir integrated in underground or semi-underground manner in the foundations of artificial buildings has a lateral wall thickness in the range 20 cm to 45 cm and a bottom thickness in the range 10 cm to 25 cm.

16. A method of producing supplementary electrical energy for an electricity network, the method including at least a first step of using a first source of electrical energy to drive a pumping installation in order to pump water from a second water reservoir situated at a second level to a first water reservoir situated at a first level higher than the second level with a level difference of at least 5 meters and a slope of at least 3%, and a second step of feeding a hydro-electric generating system from said first water reservoir, the method being wherein it includes a preliminary step of providing at least said first water reservoir from at least one individual reservoir situated in the underground or semi-underground lower portion of artificial buildings that need to be built for a primary function independently of a secondary function of producing electricity, said first water reservoir integrated in underground or semi-underground manner in the foundations of artificial buildings having a cumulative volume in the range 1000 $m^3$ to 150,000 $m^3$, said second water reservoirs likewise being situated at ground level using a natural slope of the ground, and the hydro-electric generating system having a power rating in the range 100 kW to 4 MW.

17. A method according to claim 16, wherein said first water reservoir further constitutes a hot source for an air-conditioning installation or a refrigeration installation or a cold source for an installation for heating some or all of said artificial buildings or associated buildings, said air-conditioning installation or said refrigeration installation and said heating installation each including at least one heat pump.

18. A method according to claim 16, wherein water is pumped from said second water reservoir and the hydro-electric generating system is fed with water from said first water reservoir at least partially via a common pipe with two-way flow of fluid.

19. A method according to claim 16, wherein water is pumped from said second water reservoir via a first communicating pipe equipped with at least one remote-controlled valve and the hydro-electric generating system is fed with water from said first water reservoir via at least one second communicating pipe equipped with at least one remote-controlled valve.

20. A method according to claim 16, wherein said second water reservoir is situated in the underground or semi-underground lower portion of artificial buildings that need to be built for a primary function independently of a secondary function of producing electricity and the electrical energy produced by the hydro-electric generator system associated with said second water reservoir is used at least in part for the local supply of electrical energy to artificial buildings in the lower portion of which said second water reservoir is situated or an associated building situated in the immediate vicinity of that artificial building.

* * * * *